United States Patent [19]

Busalacchi

[11] Patent Number: 4,548,225

[45] Date of Patent: Oct. 22, 1985

[54] IRRIGATION CONTROL SYSTEM

[76] Inventor: Dwight J. Busalacchi, 181 Simpson Dr., Daly City, Calif. 94015

[21] Appl. No.: 416,170

[22] Filed: Sep. 9, 1982

Related U.S. Application Data

[63] Continuation-in-part of Ser. No. 306,008, Sep. 28, 1981, abandoned.

[51] Int. Cl.[4] ..................... A01G 25/16; G01N 19/10
[52] U.S. Cl. .............................. 137/78.3; 137/624.11; 239/64; 239/70; 239/69; 73/73
[58] Field of Search .................... 239/63, 64, 69, 70; 73/73; 137/78.3, 78.2, 624.11, 624.2

[56] References Cited

U.S. PATENT DOCUMENTS

| | | | |
|---|---|---|---|
| 3,898,872 | 8/1975 | Skaling et al. | 73/73 |
| 3,961,753 | 6/1976 | Sears | 73/73 |
| 3,991,375 | 11/1976 | Riggs et al. | 239/64 |
| 4,015,366 | 4/1977 | Hall, III | 239/69 |
| 4,176,395 | 11/1979 | Evelyn-Veere et al. | 137/624.11 |
| 4,190,884 | 2/1980 | Medina | 239/63 |
| 4,197,866 | 4/1980 | Neal | 137/78.3 |
| 4,209,131 | 6/1980 | Barash et al. | 239/69 |
| 4,304,989 | 12/1981 | Vos et al. | 239/63 |

FOREIGN PATENT DOCUMENTS

2052106  1/1981  United Kingdom ............... 137/78.3

*Primary Examiner*—A. Michael Chambers
*Attorney, Agent, or Firm*—Flehr, Hohbach, Test, Albritton & Herbert

[57] ABSTRACT

An automatic irrigation control system provides the improvement in the prior art, which has previously set irrigation time by a preset or predetermined amounts, by providing for feedback from the field by means of tensiometers or other types of sensors. The tensiometers are made completely automatic and have a continuous analog signal output by the use of a backward gage pressure transducer. The tensiometers also have remote refill capabilities so that they do not have to be manually filled. Energy is saved by time sharing irrigation. Water hammer is prevented by lagging the turn-off of the field which was previously being irrigated until turn-on of the next field. Water ponding is prevented by providing time lag to allow water to penetrate the soil.

14 Claims, 12 Drawing Figures

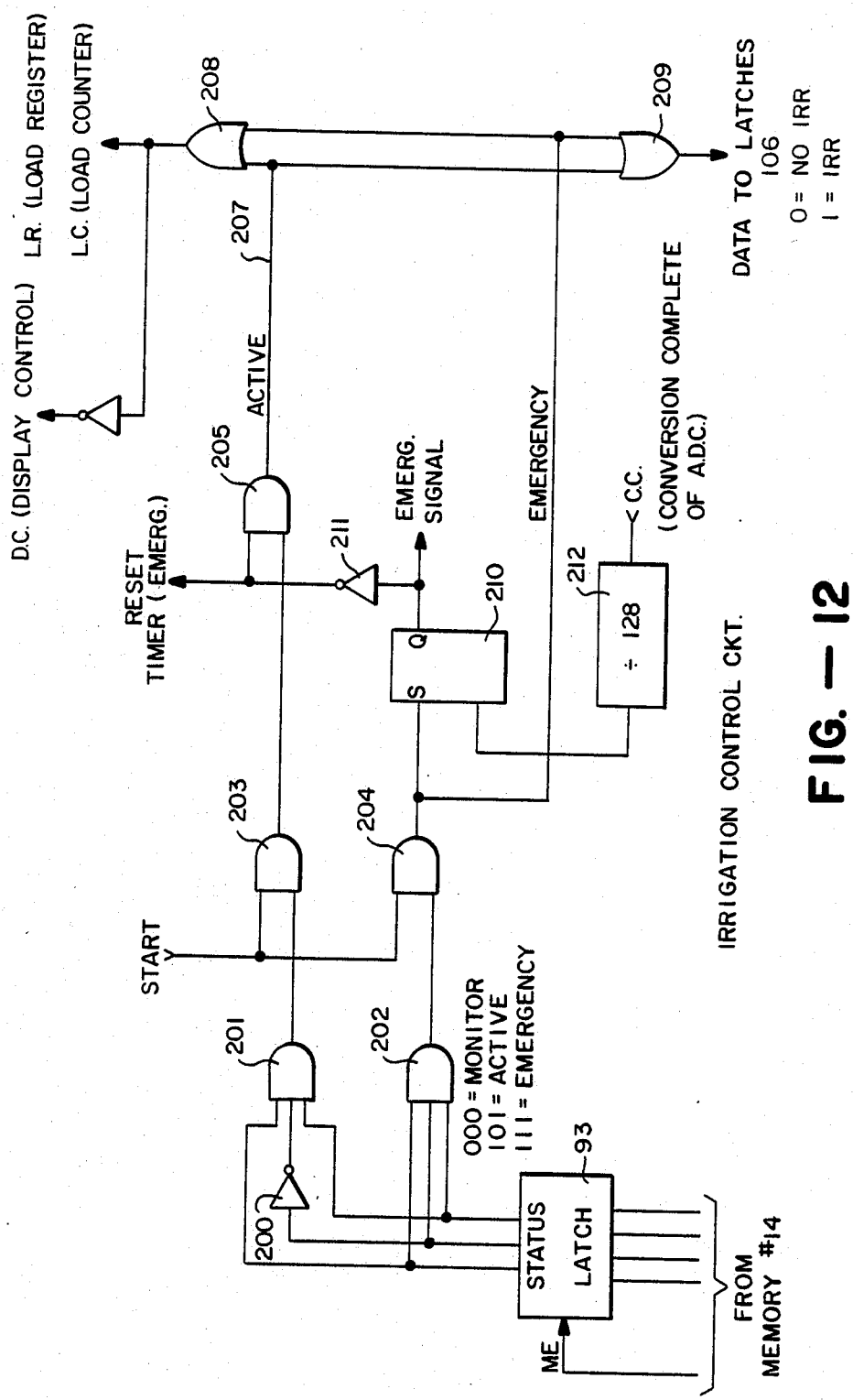
FIG.—12

IRRIGATION CONTROL SYSTEM

This is a continuation-in-part application of Ser. No. 306,008, filed Sept. 28, 1091 now abandoned.

The present invention is directed to an irrigation system and more particularly to a system which is especially sensitive to varying environmental and soil conditions.

Many computer controlled irrigation systems have been proposed. For example, U.S. Pat. No. 4,209,131 assigned to Motorola Inc., issued on June 24, 1980, commenting on the deficiencies of open-loop systems where, for example, an agricultural area is irrigated once a week for a predetermined time interval, seeks to obviate these shortcomings by computing, in response to environmental conditions, the optimum quantity of water to be delivered. However, this is still a predetermined amount and is not a true demand or feedback system.

The Motorola patent in its description of prior art does speak of sensing the moisture level in the soil and irrigating accordingly, but states that controlling the delivery of water was very inaccurate. Typical of such a system is U.S. Pat. No. 4,015,366 to Hall issued Apr. 5, 1977. This patent discloses starting irrigation by a tensiometer reading which measures soil moisture and then computing (see columns 46–50) the necessary amount of water.

Another automatic system has been proposed by the Irrometer Company of Riverside, Calif. In standard use, this system uses a tensiometer having a mechanical gage which by means of a set of contacts is set to reject unnecessary irrigation. In their brochure, the Irrometer Company speaks of directly switching water control solenoid valves. It is believed this can be accomplished only with the use of a pair of tensiometers with mechanical gages which have been preset. But again, the general Irrometer system concentrates on irrigating with a predetermined and set amount of water.

Finally, another irrigation system which is known under the trademark "RAIN BIRD" includes a controller in a residential setting which sequentially irrigates various portions of a lawn or orchard for predetermined time intervals.

The foregoing systems are adequate when water is present in abundant quantities, energy costs are not a problem, and when soil conditions and land topography are homogeneous. However, if any of these conditions are not present, serious defects can result. Specifically, when water delivery is controlled by a time clock and the same water allocated to a field everyday, the field can be over-irrigated or under-irrigated due to climatic conditions. In addition, water delivery to meet crop needs of loose soils will rot plants in those areas with heavier soils. Yet, if water is limited to needs of the heavier soil, part of the crop will be stunted and production lost or high labor costs must be incurred to water by hand.

Soil can also vary from sandy loam, absorbing and losing water rapidly, to clay with its high water retention approaching an impervious water membrane. The soil conditions on one farm or orchard may cover the extremes of the above two soils and combinations in between. Sometimes the foregoing conditions occur on farms and orchards which include level bottom land to sloping and higher elevation hill property. The latter condition can result in temperature elevation differences; microclimates within one property.

With limited water and/or energy, the farm cannot be watered simultaneously. Thus, the water must be apportioned. And this becomes critical where there are critical frost or temperatures which must be ameliorated by application of water.

Thus, in summary, water is the limited resource which is used to:

A. Combat frost damage to crops.
B. Is the vehicle to bring pesticides and fertilizers and beneficial trace elements to crops.
C. Irrigates for plant growth and
D. Best protects the crops.

Prior systems have not met the above objectives when confronted with varying soil conditions, microclimates, and limited water and energy supplies.

Another difficulty with automatic systems has been their lack of flexibility in that there is a dedicated relationship between, for example, a temperature gage and the field for which a resultant control action such as irrigation is taken. This system also presents difficulties where, for example, temperature, wind and moisture all have an effect on what irrigation is desired and in what field.

It is, therefore, an object of this invention to provide an irrigation control system for irrigating a plurality of different agricultural fields comprising for each of the fields a main distributing means for distributing water to the field from a water source including a main valve means for controlling the flow of water from the water source to the main distributing means; and a plurality of environmental sensing means in the fields for electrically indicating and monitoring an environmental condition. Digital control and storage means correlate the electrical indication of each of the sensing means to one or more predetermined limits for controlling one or more of the field valve means.

There is also provided an irrigation control system for irrigating a predetermined number of different agricultural fields. This system comprises for each of the fields, main distributing means for distributing water to the field from a water source including main valve means for controlling the flow of water from the water source to the main distributing means. Tensiometer means are in each of the fields for sensing soil moisture and providing a continuous analog electric signal indicative of the moisture. Automatic control means connected to the main valve means are responsive to the analog signals for initiating the flow of water to a field in response to the signal coinciding with a preset value and for discontinuing the flow of water in response to the analog signal coinciding with a preset value.

To accomplish the foregoing, the tensiometer means is provided with a backward gage pressure transducer which is connected to the vacuum port of the tensiometer itself along with automatic remote controlled water refill means.

FIG. 12 is a block logic diagram in detail of the irrigation control circuit of FIG. 6.

Figure 1:
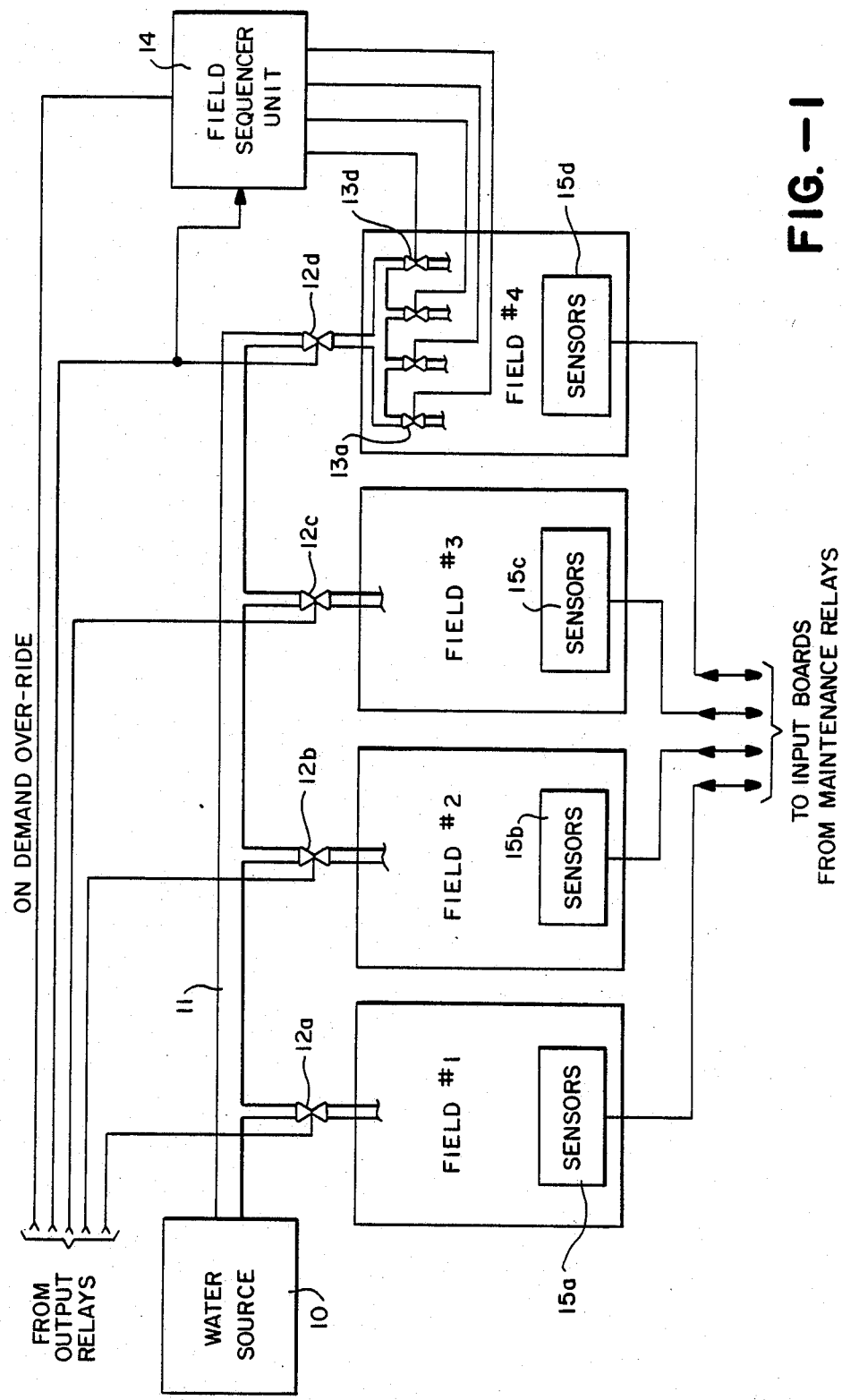
FIG. 1 is a block diagram showing the application of the invention to agricultural fields.

FIG. 1 illustrates the application of the system of the present invention to four agricultural fields designated Field No. 1 through Field No. 4. This might be a typical farm. A water source 10 via the pipeline 11 supplies water to the several fields through the main valves 12a through 12d. Thus, the valves 12 act as the main valve means to control the flow of water to a particular field. However, as shown by Field No. 4, for some soil conditions, it may be desirable to divide a particular field into, for example, the four quadrants as illustrated by the four branch valves 13a through 13d. As illustrated, these valves are controlled by a field sequencer unit 14; and as will be discussed below, such a subsystem is especially useful where the soil is relatively impermeable to water and thus ponding might occur.

In each field is a block 15a through 15d designated sensors. In the preferred embodiment, which will be discussed below, the typical sensors are tensiometers which are in effect artificial roots for sensing moisture in the soil. However, in addition to soil moisture, such sensors would include temperature sensors, both high and low to prevent burn and frost conditions respectively, humidity, dew point, and other types. And the sensors depending on the hoxogeneity of the field would necessarily not be in one location only, but there might be several sensors throughout the field.

Finally, all of the control lines of FIG. 1 are coupled back to a centralized automatic control unit as indicated which is shown in detail in FIGS. 5-9.

Figure 2:
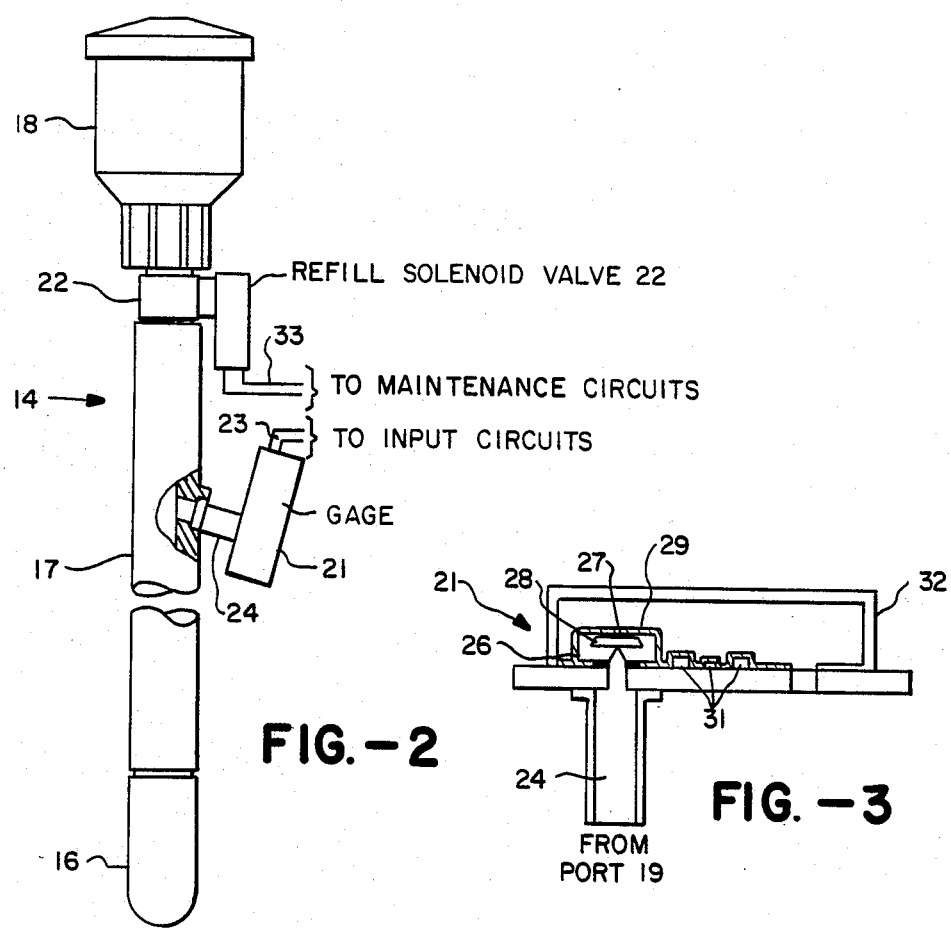
FIG. 2 is a simplified side elevation view of a tensiometer and associated gages and solenoids embodying the present invention.

FIG. 2 illustrates the details of a tensiometer moisture sensor embodying the present invention. The basic tensiometer, which is well-known in the art, consists of a ceramic sensing tip 16, a plastic body tube 17 filled with water, a water reservoir 18 and a vacuum port 19. Usually the tensiometer is placed in the soil and the ceramic tip transfers moisture from the air tight tube 17 to the soil and a vacuum measured in centibars is developed. This is typically measured by an analog gage, indicated at 21, having a dial or scale and pointer and is visually read. The gage is, of course, attached to the vacuum port 19.

Since water is continually being drawn out of the tensiometer, air tends to accumulate at the upper portion of tube 17 and thus reservoir 18 must normally be hand actuated to refill the body tube 17.

However, in accordance with the present invention, interposed between reservoir 18 and body 17 is a refill solenoid valve 22. It is remotely actuated by the automatic control unit of FIGS. 5-9 to refill the tube at appropriate times. The solenoid valve is a standard one available, for example, from Automatic Switch Company of Florham Park, N.J., otherwise known as an Asco Valve, and is a two-way direct acting solenoid valve which is normally closed and opened on activation as disclosed in their Bulletins 8262, 8263.

Figure 3:
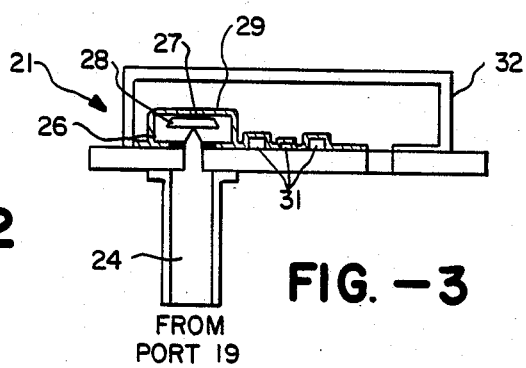
FIG. 3 is a cross-sectional view of a gage used in the present invention.

Also, in accordance with the invention, the gage 21 is not of the standard visually read type; but instead, is a backward gage pressure transducer which on its output lines 23 produces a continuous analog signal which is indicative of the vacuum at port 19. Such gage is shown in greater detail in cross-section in FIG. 3 and is a fully solid-state gage which is available from, for example, National Semiconductor Corporation of Santa Clara, Calif. under the Series LX18XX. These units are especially designed for use with liquids which are applied to the backward gage input port 24 which is, of course, coupled to the vacuum port 19 of the main tensiometer unit. The gage itself is completely solid-state comprising a silicon crystal 26, a sensing element 27 having a sensor cavity 28 and which is encased in a metallic housing 29. Appropriate solid-state circuit components are illustrated at 31. A ceramic or metal cover 32 is provided over the entire unit. In summary, the backward gage can be used with an aqueous working fluid and references to a dry ambient which, of course, is the ambient air.

Referring back to FIG. 2, the sensing leads 23 which continuously indicate the vacuum in the tensiometer unit are coupled to the automatic control unit along with the lead pair 33 which actuates the refill solenoid valve 22. In general, suitable tensiometers which can be modified to embody the present invention are available as Model 2725 from Soil Moisture Equipment Corporation of Santa Barbara, Calif.

Now referring to FIGS. 5-9, these show the centralized automatic control unit for the irrigation system of the present invention. In the preferred embodiment, sensors are tensiometers, as illustrated in FIG. 2.

Figure 5:
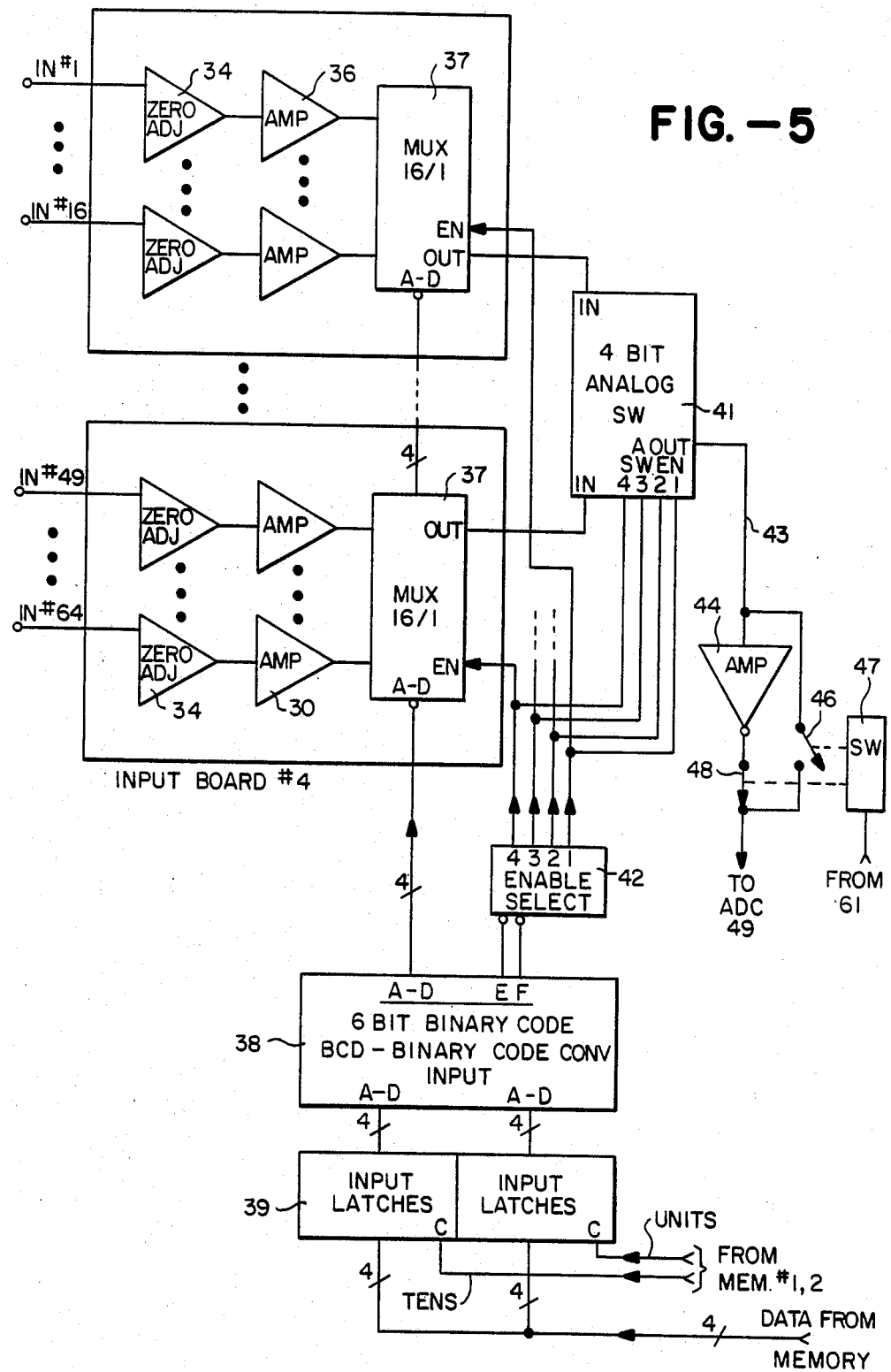
FIGS. 5, 6, 7, 8 and 9 are digital logic block diagrams of a circuit embodying the present invention.
Figure 7:
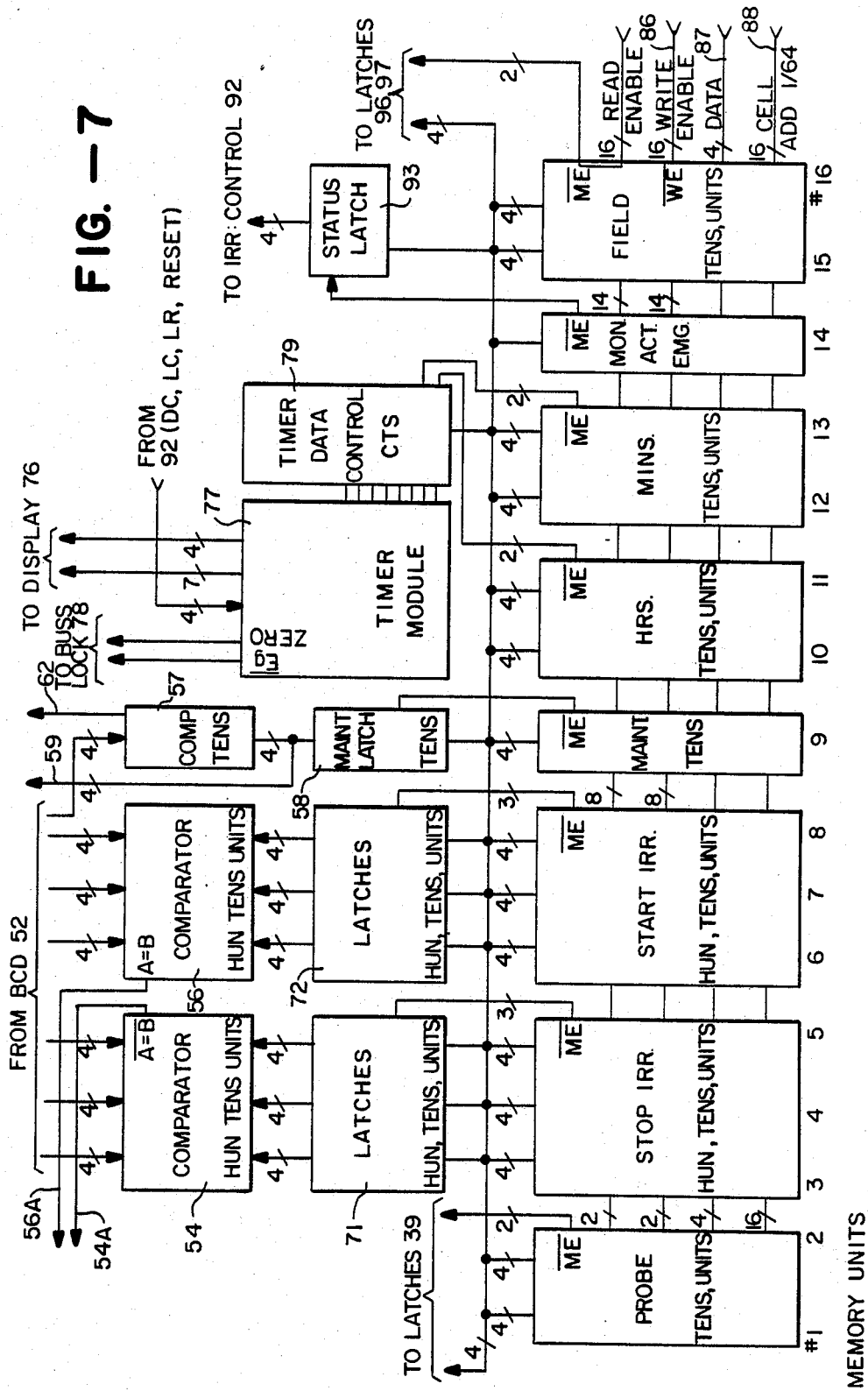

First, referring to FIG. 5, the system of the present invention is capable of monitoring, in its preferred embodiment, 64 environmental sensing inputs. There is an input board No. 1 capable of 16 inputs and 3 other input boards, the input board No. 4 also being indicated. These inputs, of course, are analog electrical signals which may be a tensiometer input or, for that matter, other types of environmental inputs such as temperature, humidity, dew point, wind, etc. Each input board has 16 sets of amplifiers including a zero adjust amplifier 34 to provide an accurate zero level, and then a scaling amplifier 36 to scale input values to a uniform analog level for processing by the digital circuitry. The 16 input signals are then multiplexed by a 16 to 1 digital multiplex unit 37. Each unit is addressed in sequence by the code converter 38 which in turn is driven by the input of latches 39 from the main memory. More specifically, the portion of the main memory which, as illustrated in FIG. 7, are probe memories No. 1 and No. 2 which contains 64 "cell" locations, each of which is addressable and which correspond to the 64 sensing or probe inputs. Each of the 64 analog inputs is selected by the binary code stored in memory units No. 1 and No. 2 which is programmed by the user to select the inputs in any desired sequence.

Finally, there is an analog switch 41 connected to the four 16 line multiplexers 37, which is driven by an enable select unit 42 connected to sequencer converter 38, which sequentially provides on an analog output line 43, each of the 64 analog inputs in sequence. In practice, the scanning sequence would be once per five seconds. However, other timings can be used depending on the application and the need for faster monitoring of changing values.

The analog output on line 43 is coupled to an inverter scaling amplifier 44. The reason for the inversion is the unusual output of the tensiometer device where it has a normal voltage of approximately 7.5 volts, and as the vacuum rises (indicating a drying out of the soil), it drops to 2.5 volts. Thus, the voltage is going in the opposite direction and is inconvenient for digital processing. Inverter amplifier 44 compensates for this. And, in addition, the above voltages mentioned have, of course, been zeroed and scaled by the amplifiers in the input boards.

However, other devices, like temperature probes, etc., would not require this amplifier. Thus, there is a by-pass switch 46 driven by the switch actuator 47 which also opens the circuit at 48. The switch actuator 47 is actually driven by an indication from the memory that no maintenance is to be conducted on this type of sensing device. As discussed above, all of the tensiometers, of course, require periodic maintenance by adding additional water to them. Thus, a lack of maintenance indicates it is not a tensiometer sensing device or probe.

Figure 6:
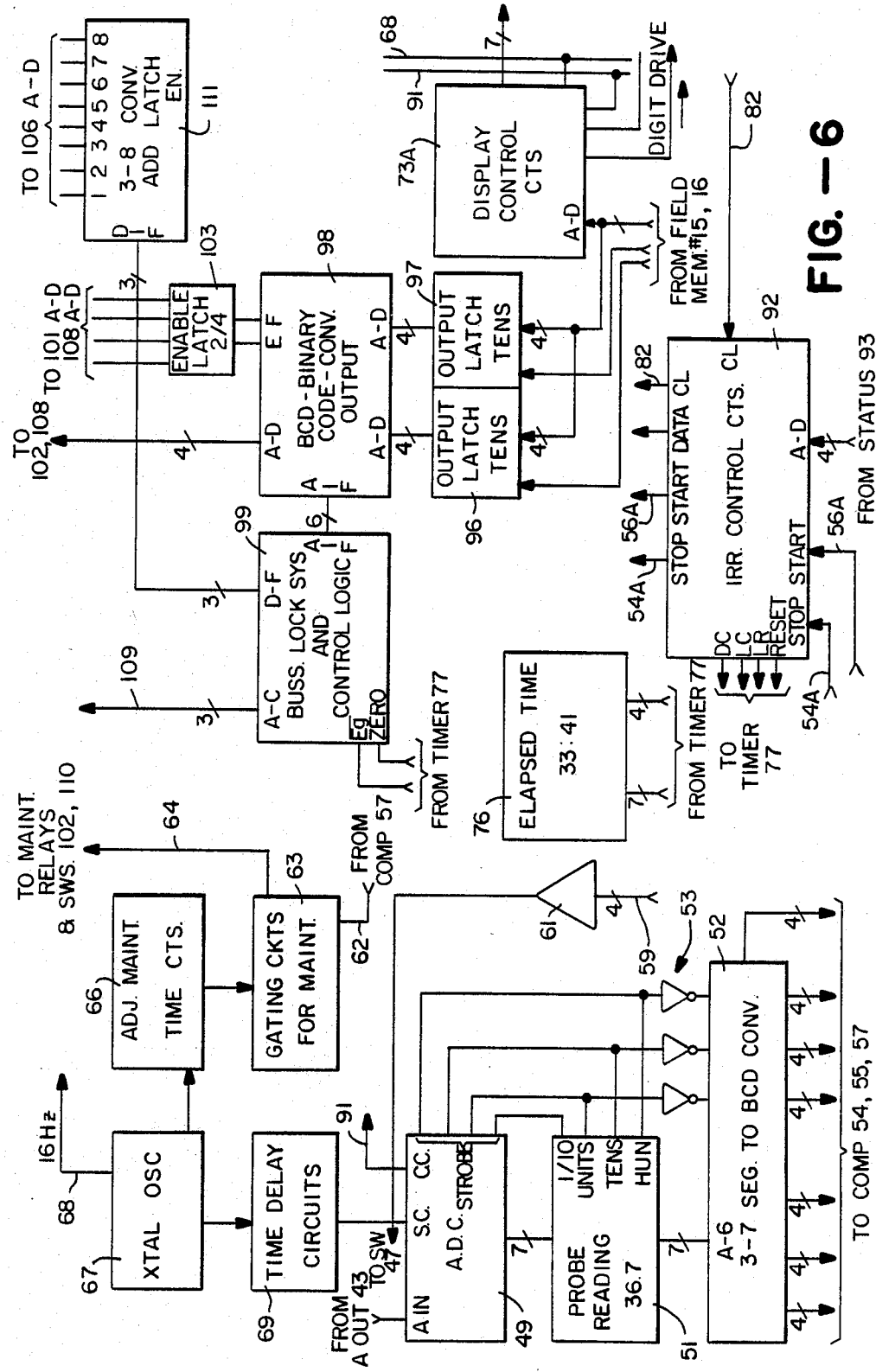

The analog output 43 coupled through amplifier 44 is converted by analog-to-digital converter 49 FIG. 6 which in turn is tied by a seven line output to the digital readout 51 which may be, for example, of the seven segment light emitting diode (L.E.D.) type.

Next, unit 52 is a binary coded decimal converter which receives this seven segment output, and in combination with the three strobe units indicated at 53 from the A.D.C. unit 49, provides duplicate sets of BCD coded analog data in the form of 100's, 10's and unit's.

Now, referring briefly to FIG. 7, these outputs are tied into a first set of comparators 54 which relate to stop irrigation and a second set of comparators 56 which relate to starting irrigation.

In addition, there is a final comparator 57 which is dedicated to tensiometer maintenance. The input to that comparator is from a tensiometer maintenance latch 58 which is loaded from a tensiometer maintenance memory designated memory No. 9 to determine at what moisture level the tensiometer is to be refilled. Thus, as discussed above, there is an interconnection line 59 through an OR gate 61 (see FIG. 6) which if a high signal indicates it is truly a tensiometer which is being handled and thus the switch actuator 47 should place the switch in the non-by-pass position.

Still referring to FIG. 6, an equal output from comparator 57 on a line 62 to a gating unit 63 effectively enables, on its output line 54, the maintenance relays. In addition, there is an adjustable maintenance time circuit 66 which is ANDed with the comparator indication to allow the passage of a set number of days before maintenance is to be accomplished. This time circuit is driven by a master clock crystal oscillator 67 which provides one pulse per minute. In addition, the oscillator has a 16 Hz output 68 used in other portions of the circuit and a one pulse per second output driving time delay circuit 69 which facilitates conversion in unit 49.

Three latches 71 (FIG. 7) designated 100's, 10's and unit's provide the other input to stop comparators 54, and three other similar latches 72 provide the other inputs to the start comparators 56. Each of these latch units is strobed by the associated memories No. 3 through No. 5 for the stop latches and Nos. 6, 7 and 8 for the start latches. Memory enable, ME, is applied to a respective clockable latch so that as a memory enable is strobed by the memory read circuit it also clocks that information into the latch and holds it in the latch in permanent storage until the next cycle. Thus, comparator 54 provides an output on its line 54A which is a stop irrigation signal and comparators 56 provide, when a condition of equality is reached, an output on its line 56A which is a start irrigation signal. They are coupled into an irrigation control circuit which will be discussed below.

Still referring to FIG. 7, a crucial part of the automatic control unit of the present invention are the 16 memory circuits No. 1–No. 16.

Figure 8:
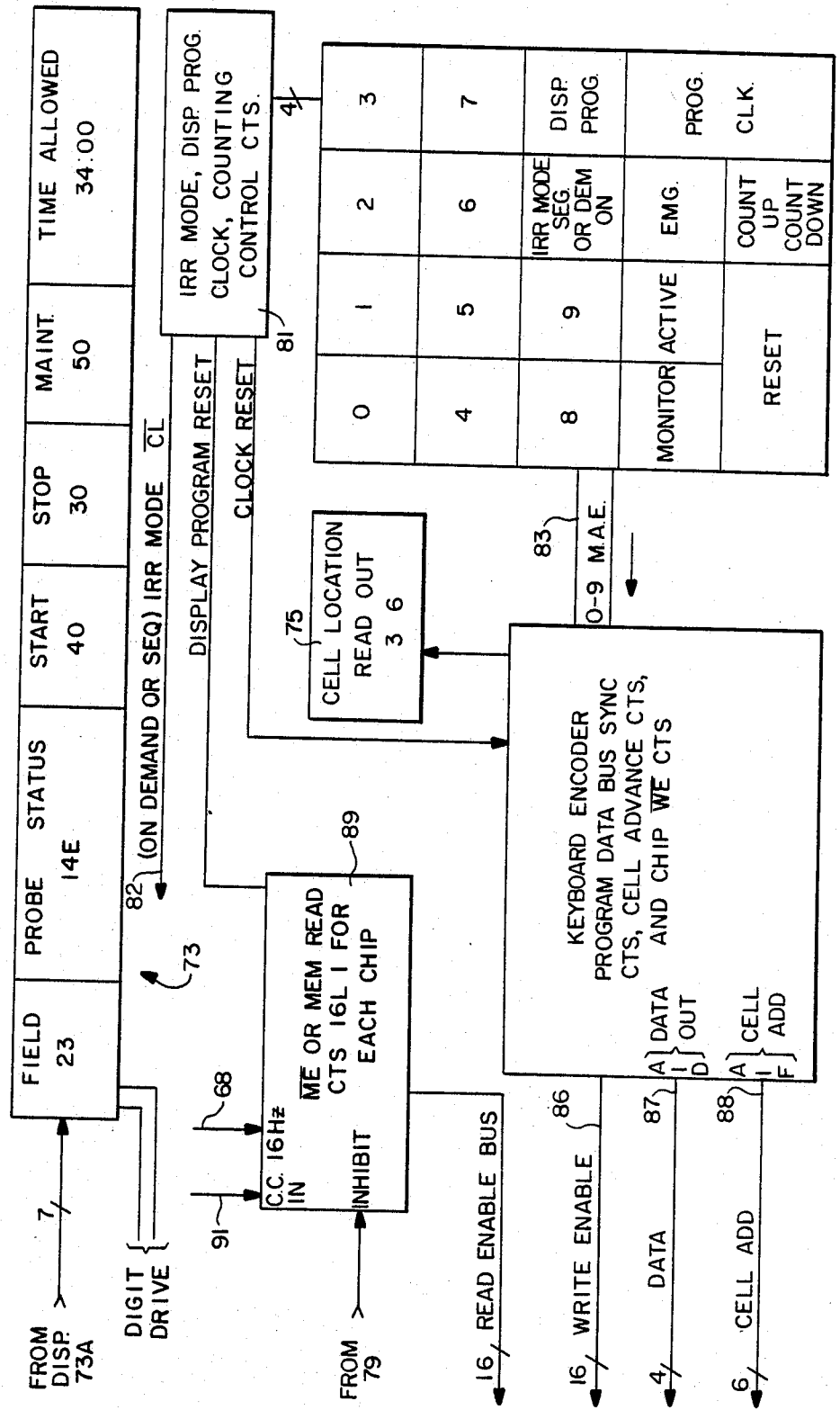

Referring briefly to FIG. 8, these memories directly relate to the digital display 73 and its associated keyboard entry unit 74. Referring both to FIGS. 7 and 8, in general, the irrigation system contains 16 sets of L.E.D. readouts to give the farmer, for example, (or other user of the system) a constant update of all the information for the system and in addition to enable the user to load the system with the proper parameters.

Referring to the digital readout group 73, the first readout is designated field number or location number. This is a two digit number of ten's and unit's which determines what field is being irrigated. In other words, in effect, what water valve in a specific case is to be actuated. Thus, the No. 23 shown indicates that No. 23 has been stored in the memories No. 15 and No. 16 (see FIG. 7) designated "Fields", and it has been stored in the cell location 36 (out of 64) as indicated by the readout 75. Each of the memories of FIG. 7 is dedicated to a particular purpose such as fields, stop, start, etc., and has 64 memory cells or locations of 4 bits per cell. Thus, it is apparent that any tensiometer probe or other environmental sensor can be linked with any field in any desired combination to produce a result. The display board of FIG. 8 enables the user to see these combinations. And, by the use of the keyboard 74 and the count-up, count-down pushbutton, different cell locations can be sequenced through.

Continuing with the display 73, the next set of two digit numbers is the probe number which can be any one of the 64 probes or sensors. Associated with that readout is a single digit or letter code to designate the status or what type of probe is being used. In general, such status might indicate that a certain probe may be used merely to monitor, provide an active irrigation situation, or be used for an emergency where it receives first preference. The status information is contained in memory No. 14. When irrigation is carried on, in accordance with the invention, it may be done on a sequential, on-demand, or emergency override basis.

The next three digit readout is "start", which is a preset limit for where irrigation is desired to be started. Thereafter, the next display is "stop" where irrigation is to be, of course, stopped. The actual probe reading is displayed in unit 51. These start and stop limits, of course, are stored in the memories No. 3 through No. 8 as discussed above.

Next, the two digit maintenance readout is, as discussed above, for maintaining the water level in the tensiometers and is stored in memory No. 9. It is programmable generally from 10 to 90 centibars. As discussed above, it is also tied into a timing circuit in which the farmer can choose anything from one to nine days for when the probe is to be checked out for maintenance. In other words, when that particular day comes up, as determined referring to FIG. 6, by timing circuit 66 and the probe is set at 40 centibars for maintenance, if 40 centibars or less is sensed, it will automatically be refilled with water.

The last four digit readout is "time allowed" which is the preset time for the amount of irrigation time allotted for that field. This is determined by memories No. 10 through No. 13. In effect, this determines the incremental amount of water which is allocated to that field.

Such sequencing occurs with these increments until that field receives a stop irrigation command.

Referring for convenience back to FIG. 7, there is an elapsed time display unit 76 driven by the display register of a timer module 77 which tells the user how much time is left in this irrigation mode increment or how much time has elapsed. This is especially useful in programming where the user can designate certain memory cells to activate certain fields or locations by certain probes. Since elapsed time can indicate the time left or the time that has elapsed, the timer module has two outputs designated equal and zero. They are coupled into the bus lock system 78 which will be described later. In any case, the two outputs indicate that that irrigation increment is over and the equal or zero is an indication that the display register has equaled the memory register or has been set to zero. More specifically, the timer module includes a memory register for information from its associated memory cells No. 10 through No. 13 (which, of course, is the desired incremental time of irrigation) and also a display register which is the amount of time elapsed or time remaining. If the registers equal to each other, if one is counting up, the equal will go low. And, if you are counting down with the data loaded into it when it reaches zero, the zero output would go low. These two outputs go into the bus lock system 78, and then initiate the sequence of irrigation as will be described below. Memory and display register timer module 77 is loaded via the timer data control circuits 79 which are tied into the memory units No. 10 through No. 13.

The display of data and the input of data is, of course, controlled by the keyboard 74 of FIG. 8. This is a key pad which is a four by five matrix of normally open switches. There are the numerals 0 through 9 which are used for storage of the numerical data in their respective memories. Storage of the initial data is accomplished by additional well-known switching (not shown). An "irrigation mode sequential" or "on-demand" pushbutton determines via the control circuits 81 the status of irrigation mode line 82 designated CL. If it is not pushed, there is a normal sequential irrigation mode. If it is activated, then CL is high and an on-demand situation results where any field demanding irrigation, whether in an active or emergency status will receive it concurrently. The timer unit 77 is by-passed in this mode. This mode is normally undesirable because of the drop in water pressure and the desire to conserve energy and water supplies by irrigating in sequence. However, this mode is useful when there is a danger of severe temperature extremes in which sequential irrigation of the crop will not keep up with the needs. This operation also can be set automatically by programming one memory location to put a logic high onto the CL bus, e.g., in response to a Master Temperature Sensor which senses an extreme temperature prediction from a central weather station.

Next, there is a "display program" pushbutton which displays the program which has just been written into the memory cell to make sure the correct information has entered.

The next row of keys are monitor, active, and emergency which program on a 4 bit bus 83, 87 4 bit codes, to indicate these respective conditions which is stored in memory No. 14. Such codes are discussed in detail in FIG. 12, the irrigation control circuit. The "programming clock" clocks to the next sequential cell location as shown by the readout 75. The count-up, count-down is a bi-stable switch which determines the direction of the programming clock. In other words, if a cell location is at 35 and something is wished to be changed in cell 33, then the count-down would be activated and the program clock would serve to count back to cell 33. Finally, the reset button resets all the timing circuits back to zero and also resets the start/stop registers in the output boards back to zero for that particular cell. Also this is tied (not shown) into a power failure reset so that all the information is set back to zero.

Keyboard 74 is tied via the bus 83 with its 0 through 9 indication and monitor, active, and emergency codes to a keyboard encoder program data bus circuit, cell advance circuits, and write enable circuits 84 to all of the memories No. 1 through No. 16. Unit 84 has, as illustrated, 16 write enable lines 86, 4 data out lines 87, and 6 cell address lines 88 which select 1 out of 64 cells of each of the 16 memory units. Thus, this combination of 3 buses enables any particular cell in any particular memory to be adequately addressed. A memory enable or read unit 89 with 16 lines, one for each memory chip, is activated by a 16 Hz input on line 68, and a conversion complete, CC, input on line 91 extending from the analog-to-digital converter 49 (FIG. 6).

Figure 11:
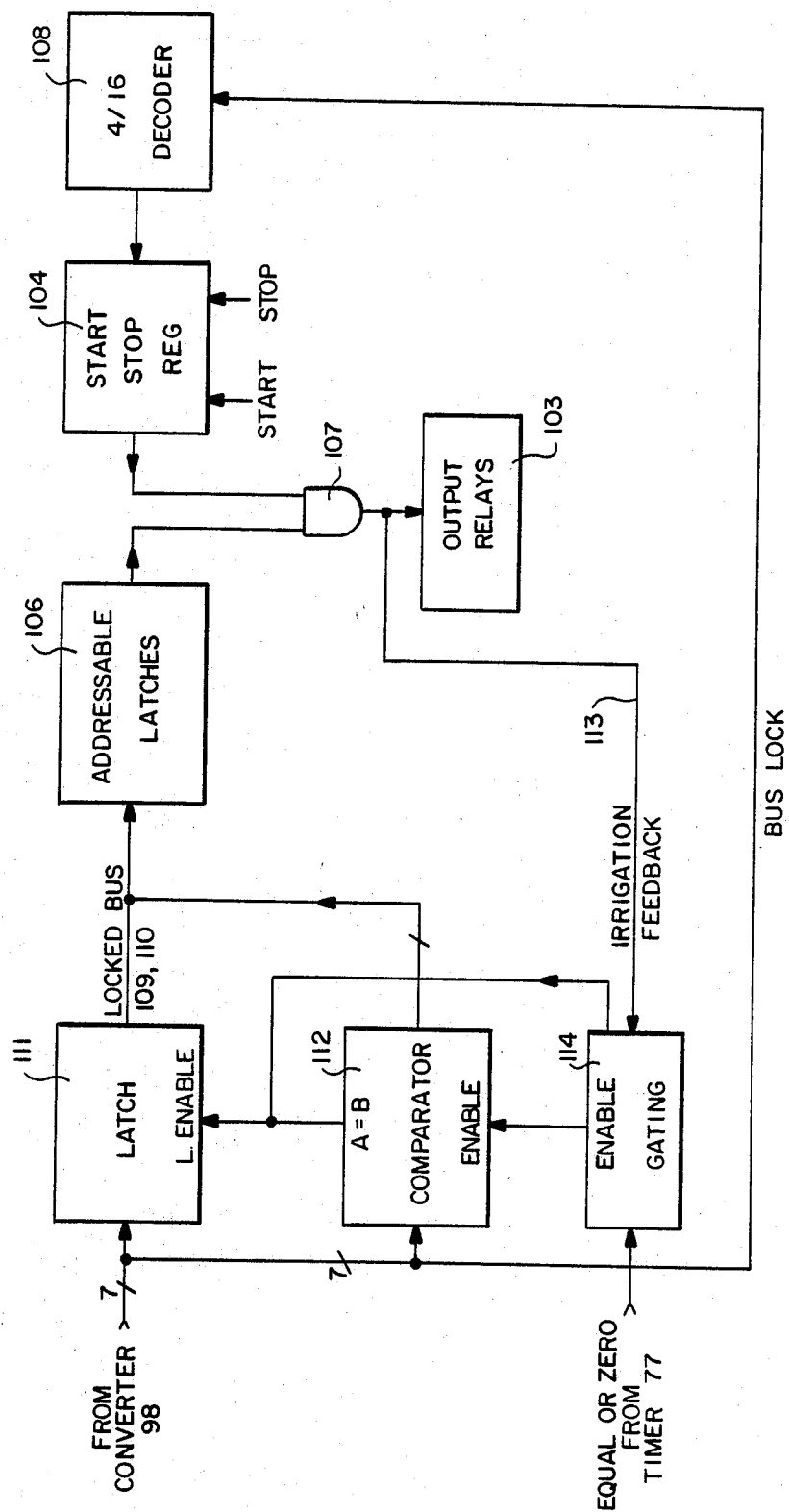
FIG. 11 is a schematic block diagram of the bus lock system block of FIG. 6.

Referring now to FIG. 6, irrigation control circuit unit 92 in conjunction with the bus lock unit 78 are the critical portions of the automatic control unit. These will be discussed generally first, and then in greater detail as they are illustrated in FIGS. 11 and 12.

First, with respect to the irrigation control circuits 92, the status input from memory No. 14 occurs via the status latch 93 which is tied into the main 4 bit data bus from the memories and in addition by a direct connection 94 from the memory enable line. In general, the irrigation control circuits control the timer module 77 by 4 outputs listed as display control (DC), load memory register (LR), and load elapsed time display counter (LC). In addition, there is a reset output which sets the timer module to zero or an equal condition to actively indicate the end of an irrigation. The start and stop comparator indications on lines 54A and 56A are coupled into the unit. In addition, is a CL input on line 82 which indicates on-demand or sequential irrigation. This is essentially a pass through line which continues on as indicated to the output relay circuits. Other outputs are a Data line which if it indicates a zero there is irrigation with respect to that particular probe, or if one then irrigation. The start and stop lines are essentially through putted also as will be described in detail below.

In general, the status latch 93 informs the irrigation control circuits if a particular probe is going to be utilized to monitor a field and thus not turn on any irrigation at all (even though it demands irrigation), or an active probe, or an emergency override probe which shuts down the non-essential merely active irrigation functions.

Next, still referring to FIG. 6, the 4 line data bus from the output of memories No. 1 through No. 16, in addition to driving display control circuits 73A, also supplies data to unit's and ten's output latches 96 and 97 which latch data from the field memories No. 15 and No. 16 via the memory enable outputs. Thus, the converter 98 provides sequential information as to what field and therefore what output relay or water valve is being sequenced through at that moment in time. This information then via the 7 bit bus 99 is coupled to the bus lock system 78.

Thus, in partial summary, one side of the bus lock system is always receiving and, in effect, monitoring the field number which is being continuously sequenced through. And, via the start/stop lines 54A and 56A from irrigation control unit 92, the output circuits are being continuously updated as to which fields require irrigation; in other words, which fields are receiving a start signal. In addition, status of the particular probe is being sent to the output circuits via the Data output line of the irrigation control circuits which indicates irrigation (1) or no irrigation (0), and also whether or not there is an emergency condition. And this emergency condition is effectively produced by the discontinuing of all ordinary active requests for irrigation via the Data control line indicating a zero when the output circuit for that particular relay is sequenced through. Thus, in effect, during the emergency override situation, all the non-essential irrigations are shut down.

Figure 9:
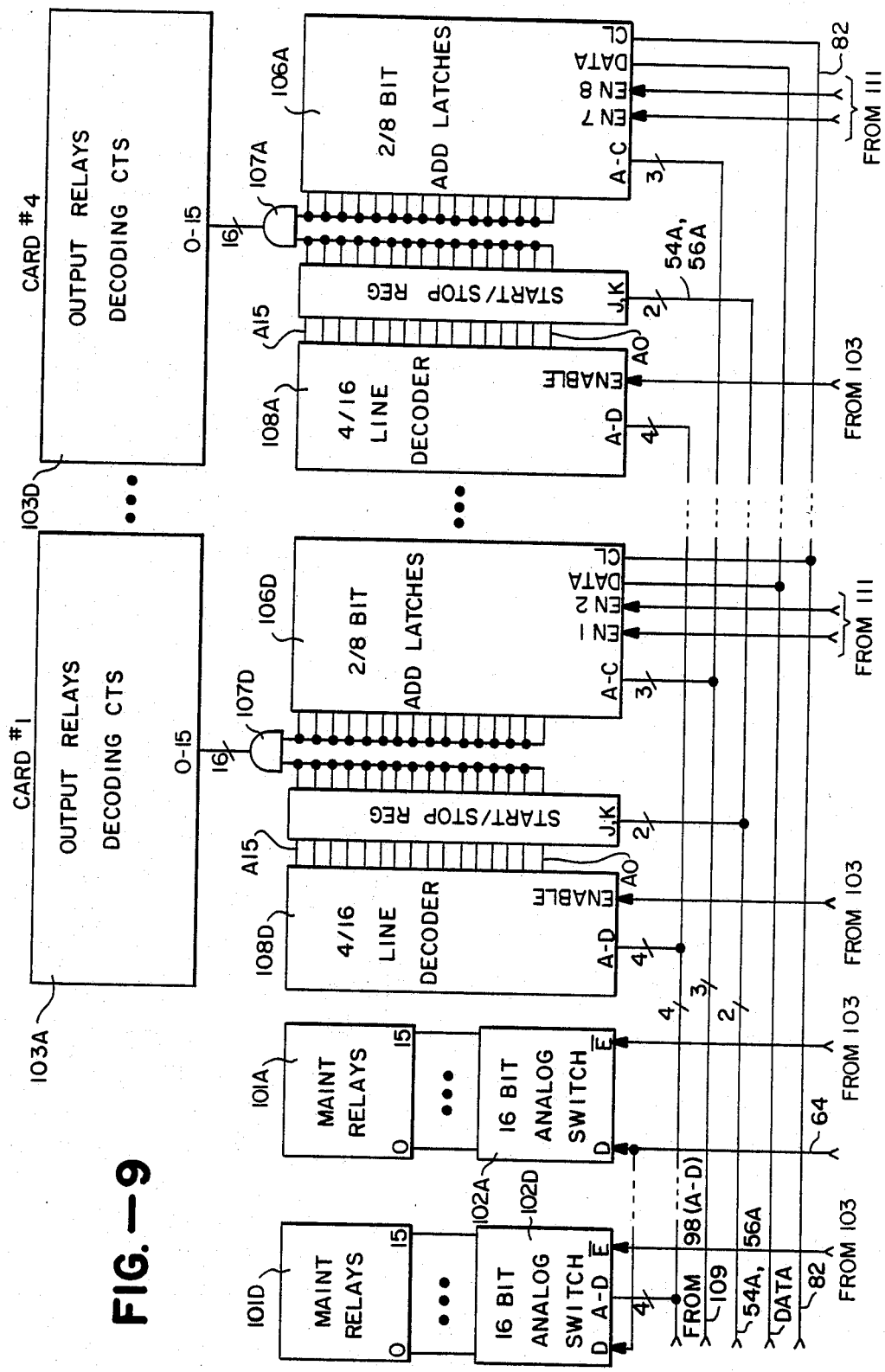

FIG. 9 shows the output circuits of the present invention. The simpler portion is the four tensiometer maintenance boards or cards numbered 1 through 4. Two are indicated as 101A and 101D. Each board 101 contains 16 outputs which are tied to the various tensiometer maintenance refill solenoid valves 22 as illustrated in FIG. 2. Each maintenance relay card or board is driven by a 16 bit analog switch 102A–102D, and these are driven in combination with the enable input 103 which is at the output of converter 98 to determine which maintenance relay of which field is to be activated. Then from the input 64 of FIG. 6, which is from the maintenance latch comparator 57 (of FIG. 7), actuation occurs if necessary.

Finally, there are four output relays, circuits or cards, 103A through 103D each having 16 outputs connected to the various, for example, relays for water valves or other device which are to be actuated. As illustrated, each includes a start/stop register 104 and an addressable latch 106 each having a 16 line bus output. These are connected together in function 107. Thus, two outputs must be present for a relay to be activated.

Start/stop register 104 consists of 16 J/K relays; the J input is indicated having a start function, and the K input stop. These are connected to the start/stop output lines 54A, 56A, respectively, from irrigation control circuits 92 (FIG. 6). Sixteen relays are scanned by a 4/16 line decoder unit 108 which is connected to the bus output of converter 98 which as discussed above scans through the various fields continuously. Thus, the start/stop register 104 is continuously updated irrespective of what is being irrigated or what function is being carried on as to whether irrigation is requested in any particular field.

Addressable latches 106 also have 16 outputs, one corresponding to each relay or other device to be activated. However, the addressable inputs of these latches are connected on the buses 109 and 110 to the bus lock and control logic unit 78. The bus lock also provides on its output bus 110 via the 3 to 8 code converter 111 enabling to select which of the 8 bit latches is being utilized. Finally, the other inputs to the addressable latches 106 are the Data output of the irrigation control circuits and the CL output on line 82 which determines whether there is to be demand irrigation or sequencing as has been discussed previously. Thus, in summary, the addressable latches 106 as controlled by the bus lock system must provide a coincident output with register 104 at the AND gate 107 for irrigation. And these latches and registers provide sequential irrigation if there is a one level at the Data input and provides on-demand, if on line 82, the CL line, there is a one.

In the emergency override mode as determined by the irrigation control circuit unit 92, all data inputs of merely active probes are set to zero indicating effectively that they do not require any irrigation. But, while all data inputs of merely active probes are disabled, their status is still stored in the start/stop register 104. The Data out line from irrigation control circuits 92 will read a logic zero when an active irrigation demand is read and a logic one when an active emergency demand is read until all emergency demands are over. This is 128 counts on two cycles. Then "active irrigation demand" will receive a logic one at Data out. The timer is set to zero via the reset output of the irrigation control circuit so that the addressable latches via the output buses 109 and 110 of the bus lock system are sequenced through until the first emergency demand matches with the request on the start/stop register 104 to activate an output relay. Further, via the CL input on line 82, rather than irrigating these emergency overrides sequentially, the activation of the on-demand line will do the same function simultaneously. This on-demand is, of course, activated by the pushbutton on the keyboard 74.

FIG. 11 illustrates the bus lock unit 78 in greater detail and how the addressable latches 106 and the start/stop register 104 are controlled. To summarize again, the start/stop register 104 continuously receives start or stop indications from the comparators 54 and 56 which are a result of the continuous monitoring of the various analog inputs. Thus, even while irrigation is being carried on, the start/stop register is continually updated with the latest irrigation requirements of the system. On the other hand, while irrigation is being carried on, meaning activation of a particular output relay, the addressable latch 106 is necessarily locked on that particular relay line. This locking is provided by the latch 111 contained in the bus lock system which is maintained in a locked condition until an enable pulse occurs from an equal comparison by comparator 112. Then the latch becomes in essence a pass through latch to sequence the other addressable latches 106 until another match occurs with the start/stop register 104. When this occurs, there is feedback from the irrigation feedback line 113, at the output of AND gate 107, to an enable gating unit 114 which effectively locks latch 111. Thus, the output of latch 111 is in effect the locked bus 109, 110. This condition is maintained until the irrigation time is ended and there is an equal or zero indication from the timer 77. Of course, a stop indication would also operate on the start/stop register 104 so that the irrigation feedback line would indicate an end of irrigation. In any case, the latch 111 becomes pass through and the "locked" bus sequences in a normal mode until the next AND indication occurs on 107 to cause irrigation feedback line 113 to lock latch 111. Thus, the bus lock system of FIG. 12 illustrates how the present condition of all environmental monitors are updated by means of the start/stop register 104 even while the addressable latch 106 is locked on one output relay, and, for example, irrigation or some other function is being carried on. This is of great significance when an emergency override is received or an on-demand pushbutton is pressed for simultaneous irrigation since all of the up-to-date information is now stored in the start/stop register 104 and can immediately be acted upon.

FIG. 12 illustrates how the emergency operation occurs and is a more detailed block diagram of the irrigation control circuits 92. The status latch 93 is connected to the 4 bit bus from the memory No. 14 which is the status memory for monitor, emergency or active probes. By the connection of the memory enable (ME) line from memory No. 14, this information is strobed into the status latch. The status latch has a 3 line output which in accordance with the data stored in memory No. 14 indicates that an associated probe merely has a monitor function (000), an active function (101), or is an emergency status (111). The output of the status latch is coupled both to two AND gates, 201 which related to the active condition and 202 which related to the emergency condition. Further, a gate 200 in series with one of the inputs to gate 201 inverts the middle zero of the active code if it is present to produce an output at the gate 201. And, of course, an emergency code would activate gate 202.

The outputs of these two AND gates are again coupled into a second pair of AND gates 203 and 204 which have as the other coincidence input a start indication. Actually a start would have to be present since this is the primary indication of a need for irrigation or other control action. The output of AND gate 203 is coupled through a second AND gate 205 and assuming its other input is high the output line 207 is high which through the OR gates 208 and 209 provides an irrigation indication (1) to the Data line which extends to the input of the addressable latches 106. At the same time, various commands such as load the register and counter of the timer to provide the proper increment of irrigation and the proper display are activated.

Now, if, for example, there is a problem of high temperature and thus an emergency condition occurs and an emergency irrigation is requested in one field, this emergency condition is sensed by the status latch since all probes are constantly being monitored. The gates 202 and 204 will be activated to set the flip-flop 210. Through the OR gate 211, this resets the timer 77 to zero (releasing the bus lock circuit) so that a scan may occur to the field relay demanding irrigation. Also the output of inverter 211 causes a low to occur to inhibit the active AND gate 205. Thus, the high output from gate 204, designated emergency, activates OR gates 208 and 209 in the same manner as the active. However, since all active lines are now inhibited, the addressable latch of the output 106 will sequence to and lock on only to those fields or relays which require irrigation on an emergency basis. In other words, all active lines are inhibited. All emergency lines are sequenced through twice by means of the divide by 128 counter 212 which after sequencing through the 64 inputs twice and receiving no other emergency indications at the status latch 93 will allow the active conditions to again reassert themselves.

Whether the emergency irrigation is sequential or done simultaneously is, of course, determined by the CL input on-demand input 82 to the latches 106. The CL input as explained can be controlled automatically or by the pushbutton on-demand key button on the keyboard 74 which activates line 82.

In normal operation, of course, to save water and energy, the fields are sequenced through. Typically, for irrigation purposes, the time selected would be in terms of hours or large fractions of hours. On the other hand, in the case of frost conditions where immediate application of water to several areas is necessary, a time of, for example, two minutes might be used. This would allow the various fields which were threatened by frost conditions to be sequenced through quickly. In any case, this sequencing would continue until the sensor indicating a dew point, for example, would provide a stop irrigation signal. In other words, the fields would have water applied until the need for such water was definitively ended as measured by the sensor. This is to be compared to prior techniques where predetermined total amounts of water were computed in advance with no feedback.

Figure 4:
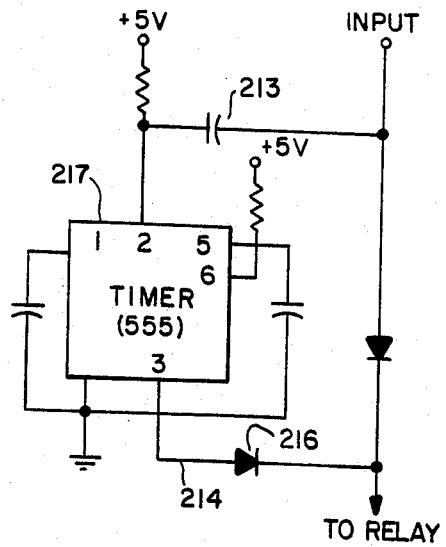
FIG. 4 is a detailed circuit schematic of one block of FIG. 9.

FIG. 4 shows in detail the anti-water hammer timing circuit which would be placed between the output of AND gate 107 and the actual output relays themselves. There are, of course, 16 AND gates. This input is coupled through a capacitor 213 to a 555-type timer. For stop irrigation, this is a negative going input which immediately produces on the output line 214 through the diode 216 a positive level to the associated relay. Thus, interruption of the relay is temporarily prevented. And then, in a manner well-known in the art, the 555 timer indicated at 217 times out and then moves line 214 to zero level to allow the relay to open and the solenoid valve to open.

In operation, the system is, therefore, supplying water to two sets of sprinklers at the same time. Thus, this lowers the pressure due to a limited amount of water going to the main supply line. In essence, what is being done, is the two supply lines are on at the same time to lower pressure somewhat rather than abruptly raising it. Thus, a water hammer effect is avoided. The avoidance of such water hammer effect is especially crucial in cold weather when plastic pipes, which are typically used in irrigation systems, are brittle.

Regarding the tensiometer maintenance, this is necessary since tensiometers which are filled with water or ethylene glycol and a water solution have a tendency at higher vacuum or centibar readings to aerate and thus produce an air column at the top of the tube 17 which buffers the water column. This has a tendency to lower the accuracy of the system. In the past, tensiometers provided for a pushbutton filling which was done by manually going to each tensiometer to refill it. Such refilling is especially necessary where a very high vacuum or dry reading of, for example, 70 centibars is used. This would be the case where in a vineyard the grower was trying to build up sugar content. At this high vacuum reading, tensiometers gain an air column in a manner of one or two days. Thus, it is necessary to refill every second or third day. The circuit of the present invention, as will be described, is set so that in a situation as this a preset refill level of 60 centibars would be inputed into the circuit so that when the reading fell to 60 centibars the solenoid valve 22 would be actuated. Such refill action does not appreciably affect the accuracy of measurement since recovery occurs within a few minutes up to an hour maximum.

Figure 10:
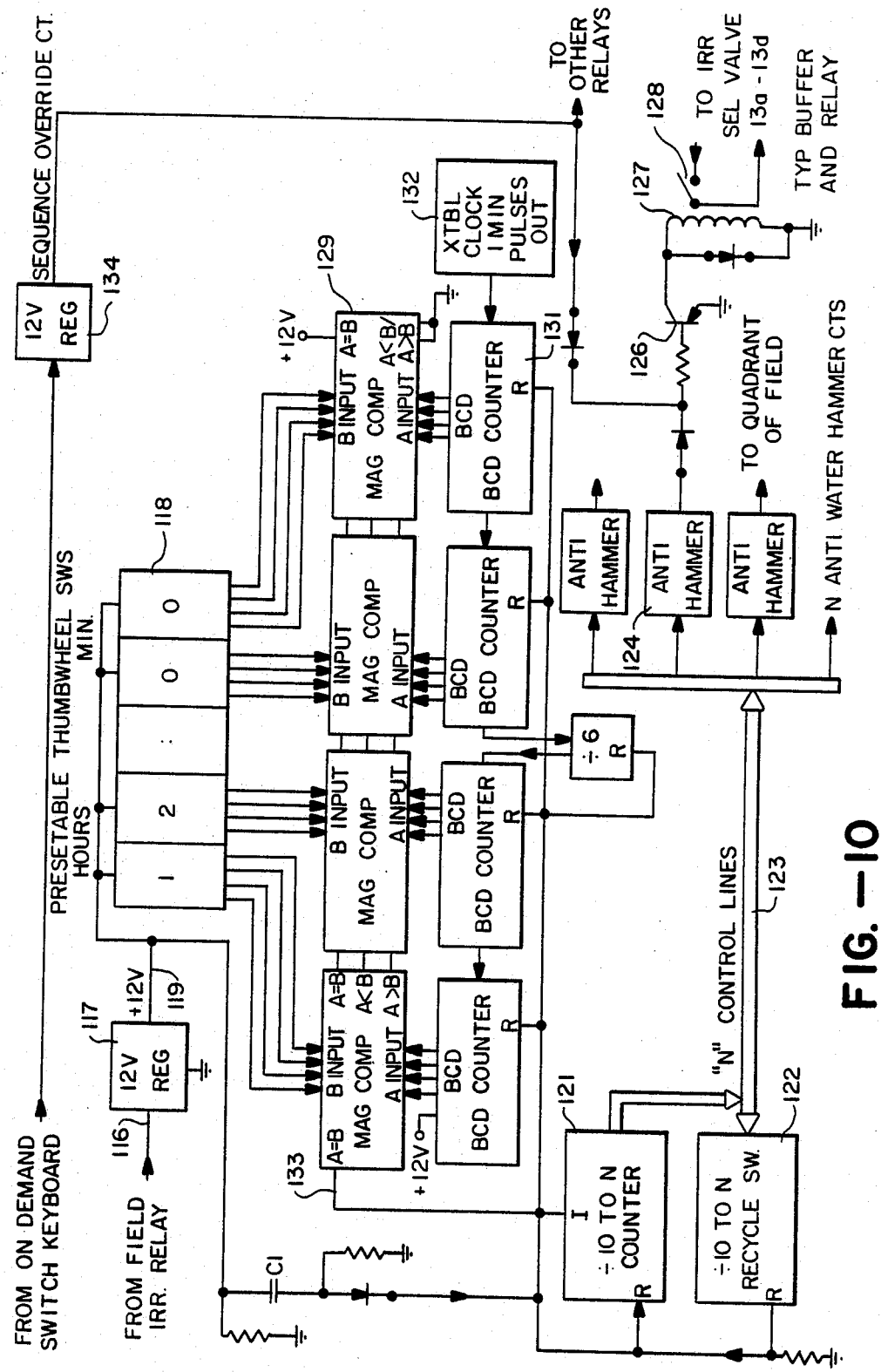
FIG. 10 is a block logic diagram of an alternative embodiment and an addition to the circuit of FIG. 9.

FIG. 10 illustrates the field sequencer unit 14 of FIG. 1 in greater detail. Its purpose is to allow for a time lag for water penetration in the soil in order that the associated tensiometer provide a true reading. Thus, the purpose of the system as illustrated in FIG. 1 is to time share irrigation water during normal irrigation demand and apportion it among, for example, various quadrants of a particular field to allow time for water penetration to take place. In heavy soils such as clay loams, such penetration may take many hours.

Referring now to the details of this circuit which is illustrated in FIG. 10, the solenoid irrigation signal which is received from one of the relays which drives, for example, valve 12d (FIG. 1) is also coupled via the line 116 to a 12 volt voltage regulator which cuts down the normal 24 volts to 12 volts. This is because 12 volts is more suitable for the logic circuits. The final output of this circuit are the four lines, as illustrated also in FIG. 1, which drive irrigation solenoid valves 13a through 13d. They are each associated with a particular quadrant of Field No. 4. Presettable thumb wheel switches 118 determine the time for which each quadrant or solenoid valve 13a through 13d will be closed or activated. This, of course, depends on the time needed to allow the water to penetrate in the soil. On the positive going edge of the 12 volt indication on the output on line 119, the pulse generated by the associated capacitor C1 initiates irrigation by resetting all logic circuits. Specifically, however, irrigation is initiated in one of the quadrants 13a through 13d by the resetting of counter 121. This activates one of the "N" control lines 123 (in this case "N" would be four lines) to activate an anti-water hammer circuit 124 (which is identical to the water hammer circuit of FIG. 5). Transistor 126 is closed to activate the relay coil 127 to thus close the contacts 128 of a particular solenoid valve.

The output of the thumb wheel switches 118 is in a binary coded decimal code and is coupled into a one set of inputs of the four magnitude comparators 129. Comparators 129 compare information coming from the timing circuits 131 driven by crystal clock 132 (and which provides one minute pulses out). When a comparison occurs, an output line 133 is high. This high signal advances the counter 121 by one count and also resets the timing circuits 131. One of the "N" control lines 123 is deactivated and next is activated. A typical anti-water hammer circuit action comes into effect where the next solenoid is immediately actuated to cause a flow of irrigating water, but the previous solenoid has its off-action lagged to prevent the abrupt rise of water pressure.

A recycle switch 122 is tied from the outputs of the counter 121 to the reset of counter 121. This purpose is to reset counter 121 back to the first solenoid after the last of the "N" series has been activated. Lastly, of course, the output from a typical field irrigation relay may either be on an active or emergency basis as determined by the foregoing circuits, both of which are done on a sequential basis. However, line 82 (FIG. 6) provides by its on-demand indication that the sequencing circuit is by-passed in the same manner as described with the main circuits. For example, in the case of a severe temperature and frost condition, all other circuit signals are overriden and all solenoids are turned on at once to irrigate the entire field.

With reference to on-demand irrigation and referring to the addressable latches 106 by putting a positive logic on the clear (CL) input there is a sequential type of operation. By putting a low in the clear input, the information that is addressed into the latch will stay permanently in the latch and thus there will be on-demand. Optionally, the clear input can be tied into a 1 by 64 bit random access memory which can be programmed by the user to eliminate the 16 data latch switches. This would allow a priority system to be utilized. But, in general, the clear input to the logic array allows sequential or on-demand irrigation to be simply implemented.

Thus, by the fact that all inputs are monitored continuously even while one field is being irrigated, new emergency conditions which may arise are immediately sensed and this system will accommodate such demands. Therefore, an improved irrigation system has been provided.

What is claimed:

1. An irrigation control system for irrigating a predetermined number of different agricultural fields comprising:
    for each of said fields main distributing means for distributing water to the field from a water source including main valve means for controlling the flow of water from said water source to said main distributing means;
    at least one unitary tensiometer means in each of said fields for sensing soil moisture to such field having a liquid filled vacuum port, such vacuum being indicative of the amount of soil moisture and including solid-state electrical means physically connected to said vacuum port for providing a continuous real time quantitative analog electric signal indicative of the amount of such moisture;
    automatic control means connected to said main valve means and responsive to said analog signals for initiating the flow of water to a field in response to said analog signal coinciding with a first preset "START" value and for discontinuing such flow of water in response to said analog signal coinciding with a second preset "STOP" value different from said first value.

2. A control system as in claim 1 where said automatic control means sequentially scans said unitary tensiometer means of said different fields and dispenses predetermined increments of water in rotation to each field until said analog signals coincide with said preset value.

3. A system as in claim 2 where said control means is responsive to said analog signals coinciding with said preset value to discontinue such flow of water even if said predetermined increment has not been dispensed.

4. A control system as in claim 1 where each of said solid state electrical means includes a backward gage pressure transducer responsive to the vacuum of said tensiometer means to provide said analog signal.

5. A control system as in claim 1 where each of said tensiometer means includes automatic liquid refill means responsive to remote control of said automatic control means for automatically refilling in response to a predetermined soil moisture condition as indicated by said analog signal.

6. A control system as in claims 1 or 2 including means associated with said main valve means of each field for delaying said discontinuance of flow provided by said automatic control means until flow to another field has been initiated whereby water hammer effects are avoided.

7. A control system as in claim 1 including lag compensation means associated with at least one field for sequentially irrigating selected portions of a field including presettable means to provide a predetermined irrigation time to allow for time lag in water penetration in the soil to provide a true tensiometer analog signal.

8. An irrigation control system for irrigating a predetermined number of different agricultural fields comprising:
    for each of said fields main distributing means for distributing water to the field from a water source including main valve means for controlling the flow of water from said water source to said main distributing means;

at least one unitary tensiometer means in eath of said fields for sensing soil moisture in such field and providing a continuous real time quantitative analog electric signal indicative of such moisture and having a vacuum port;

said unitary tensiometer means including a solid-state electrical backward gage pressure transducer physically connected to said vacuum port of said tensiometer means responsive to the vacuum of said tensiometer means to provide said analog signal;

and automatic control means connected to said main valve means and responsive to said analog signal for both initiating and discontinuing the flow of water to a field.

9. A control system as in claim 8 where each of said tensiometer means includes a water reservoir and automatic refill means responsive to remote control of said automatic control means for refilling said reservoir in response to a predetermined soil moisture condition as indicated by said analog signal.

10. A tensiometer for measuring soil moisture having a liquid filled vacuum port including means for providing a continuous real time quantitative analog electric signal indicative of said vacuum such means including a solid-state electrical backward gage pressure transducer physically connected to said port and responsive to the vacuum of sdid port to provide said continuous signal.

11. A tensiometer as in claim 10 where said tensiometer includes a water reservoir and means for automatically refilling said reservoir by remote control in response to a predetermined soil moisture condition as indicated by said analog signal.

12. An irrigation control system for irrigating a plurality of different agricultural fields comprising:

for each of said fields main distributing means for distributing water to the field from a water source including main valve means for controlling the flow of water from said water source to said main distributing means;

a plurality of environmental sensing means in said fields for electrically indicating and monitoring an environmental condition;

digital control and storage means for correlating the electrical indication of each of said sensing means to one or more predetermined limits for controlling one or more of said field valve means said digital control and storage means including keyboard entry means and a plurality of memory units each dedicated to a particular purpose including field valve means, stop and start irrigation limits which are different, and sensing means, said keyboard entry means correlating, by storing data in said memory units any desired combination of sensing means, stop and start limits and field valve means.

13. A system as in claim 12 where said digital means continuously scans and monitors said sensing means.

14. A system as in claim 13 where said digital storage means stores a predetermined limit denoting an emergency and includes control means for immediately overriding normal irrigation.

* * * * *